United States Patent
Benhase et al.

(10) Patent No.: US 8,312,210 B2
(45) Date of Patent: Nov. 13, 2012

(54) APPARATUS, SYSTEM, AND METHOD FOR STORING AND RETRIEVING COMPRESSED DATA

(76) Inventors: Michael Thomas Benhase, Tucson, AZ (US); Susan Kay Candelaria, Tucson, AZ (US); Yu-Cheng Hsu, Tucson, AZ (US); Minh-Ngoc Le Huynh, San Jose, CA (US)

( * ) Notice: Subject to any disclaimer, the term of this patent is extended or adjusted under 35 U.S.C. 154(b) by 868 days.

(21) Appl. No.: 11/969,185

(22) Filed: Jan. 3, 2008

(65) Prior Publication Data
US 2009/0177676 A1    Jul. 9, 2009

(51) Int. Cl.
*G06F 12/00* (2006.01)
*G06F 13/00* (2006.01)
*G06F 13/28* (2006.01)
*G06F 9/26* (2006.01)
*G06F 9/34* (2006.01)
*G06F 7/00* (2006.01)
*G06F 17/00* (2006.01)
*G06F 15/00* (2006.01)
*G06F 13/12* (2006.01)
*G06F 13/38* (2006.01)

(52) U.S. Cl. ............... 711/112; 711/207; 711/E12.001; 707/693; 708/203; 710/68

(58) Field of Classification Search .................. 711/112, 711/207, E12.001; 707/693; 708/203; 710/68
See application file for complete search history.

(56) References Cited

U.S. PATENT DOCUMENTS

| | | | | |
|---|---|---|---|---|
| 5,237,675 A * | 8/1993 | Hannon, Jr. | | 710/68 |
| 5,247,638 A * | 9/1993 | O'Brien et al. | | 710/68 |
| 5,313,604 A | 5/1994 | Godwin | | 395/425 |
| 5,574,952 A * | 11/1996 | Brady et al. | | 710/68 |
| 5,644,791 A * | 7/1997 | Brady et al. | | 710/68 |
| 6,360,300 B1 * | 3/2002 | Corcoran et al. | | 711/139 |
| 6,449,689 B1 * | 9/2002 | Corcoran et al. | | 711/113 |
| 6,571,362 B1 * | 5/2003 | Crater et al. | | 714/701 |
| 2003/0095712 A1 | 5/2003 | Christ et al. | | 382/232 |
| 2004/0056783 A1 * | 3/2004 | Fallon | | 341/51 |
| 2006/0190644 A1 * | 8/2006 | Fallon | | 710/68 |

* cited by examiner

*Primary Examiner* — Michael Alsip
(74) *Attorney, Agent, or Firm* — Kunzler Law Group, PC

(57) ABSTRACT

An apparatus, system, and method are disclosed for storing and retrieving compressed data. A compression module compresses a data file organized in logical tracks. A ratio module determines a track compression ratio. The track compression ratio is a ratio of an integer value n to one. A destage module destages a single directory entry for the data file to a directory. The directory entry points to a zeroth track on a hard disk drive. The destage module further destages the data file sequentially to tracks of the hard disk drive from the zeroth track with n logical tracks of the data file stored on one physical track of the hard disk drive. A stage module stages a kth logical track from a physical track of the hard disk drive. The physical track is specified by an integer value of k divided by n.

15 Claims, 8 Drawing Sheets

APPARATUS, SYSTEM, AND METHOD FOR STORING AND RETRIEVING COMPRESSED DATA

BACKGROUND OF THE INVENTION

1. Field of the Invention

This invention relates to compressed data and more particularly relates to storing and retrieving compressed data.

2. Description of the Related Art

Data storage systems are used to store large amounts of data for organizations and individuals. A data storage system may employ a plurality of hard disk drives to store data. Although the storage capacity of hard disk drives is increasing rapidly over time, the demand for storage capacity is also increasing.

Often data files are compressed to reduce the storage capacity used for each file. Unfortunately, when a large data file is compressed, a significant number of directory entries are often required to locate portions of the data file on one or more hard disk drives. The many directory entries decrease the system bandwidth and increase data latency.

SUMMARY OF THE INVENTION

From the foregoing discussion, there is a need for an apparatus, system, and method that store and retrieve compressed data. Beneficially, such an apparatus, system, and method would store compressed data with fewer directory entries and allow for the rapid location of compressed data The present invention has been developed in response to the present state of the art, and in particular, in response to the problems and needs in the art that have not yet been fully solved by currently available compressed data storage and retrieval methods. Accordingly, the present invention has been developed to provide an apparatus, system, and method for storing and retrieving compressed data that overcome many or all of the above-discussed shortcomings in the art.

The apparatus to store and retrieve compressed data is provided with a plurality of modules configured to functionally execute the steps of compressing a data file, determining a track compression ratio, destaging a single directory entry, destaging the data file, and staging a logical track. These modules in the described embodiments include a compression module, a ratio module, destage module, and a stage module.

The compression module compresses a data file organized in logical tracks. The ratio module determines a track compression ratio. The track compression ratio is a ratio of an integer value n to one.

The destage module destages a single directory entry for the data file to a directory. The directory entry points to a zeroth track on a hard disk drive. The destage module further destages the data file sequentially to tracks of the hard disk drive from the zeroth track with n logical tracks of the data file stored on one physical track of the hard disk drive.

The stage module stages a kth logical track from a physical track of the hard disk drive. The physical track is specified by an integer value of k divided by n.

A system of the present invention is also presented to store and retrieve compressed data. The system may be embodied in a data storage system. In particular, the system, in one embodiment, includes a network, a plurality of hard disk drives, and a controller.

The controller is in communication with the network and the plurality of hard disk drives. In addition, the controller manages the hard disk drives. The controller includes a compression module, a ratio module, a destage module, and a stage module.

The compression module compresses a data file organized in logical tracks. The ratio module determines a track compression ratio. The track compression ratio is a ratio of an integer value n to one.

The destage module destages a single directory entry for the data file to a directory. The directory entry points to a zeroth track on a hard disk drive. The destage module further destages the data file sequentially to tracks of the hard disk drive from the zeroth track with n logical tracks of the data file stored on one physical track of the hard disk drive.

The stage module stages a kth logical track from a physical track of the hard disk drive. The physical track is specified by an integer value of k divided by n.

A method of the present invention is also presented for storing and retrieving compressed data. The method in the disclosed embodiments substantially includes the steps to carry out the functions presented above with respect to the operation of the described apparatus and system. In one embodiment, the method includes compressing a data file, determining a track compression ratio, destaging a single directory entry, destaging the data file, and staging a logical track.

The compression module compresses a data file organized in logical tracks. The ratio module determines a track compression ratio. The track compression ratio is a ratio of an integer value n to one.

The destage module destages a single directory entry for the data file to a directory. The directory entry points to a zeroth track on a hard disk drive. The destage module further destages the data file sequentially to tracks of the hard disk drive from the zeroth track with n logical tracks of the data file stored on one physical track of the hard disk drive.

The stage module stages a kth logical track from a physical track of the hard disk drive. The physical track is specified by an integer value of k divided by n.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention stores and retrieves compressed data. The location of the compressed data may be logically determined. In addition, the present invention reduces a number of directory entries required for large compressed files. Further, the present invention keeps logically adjacent tracks physically adjacent on a hard disk drive. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
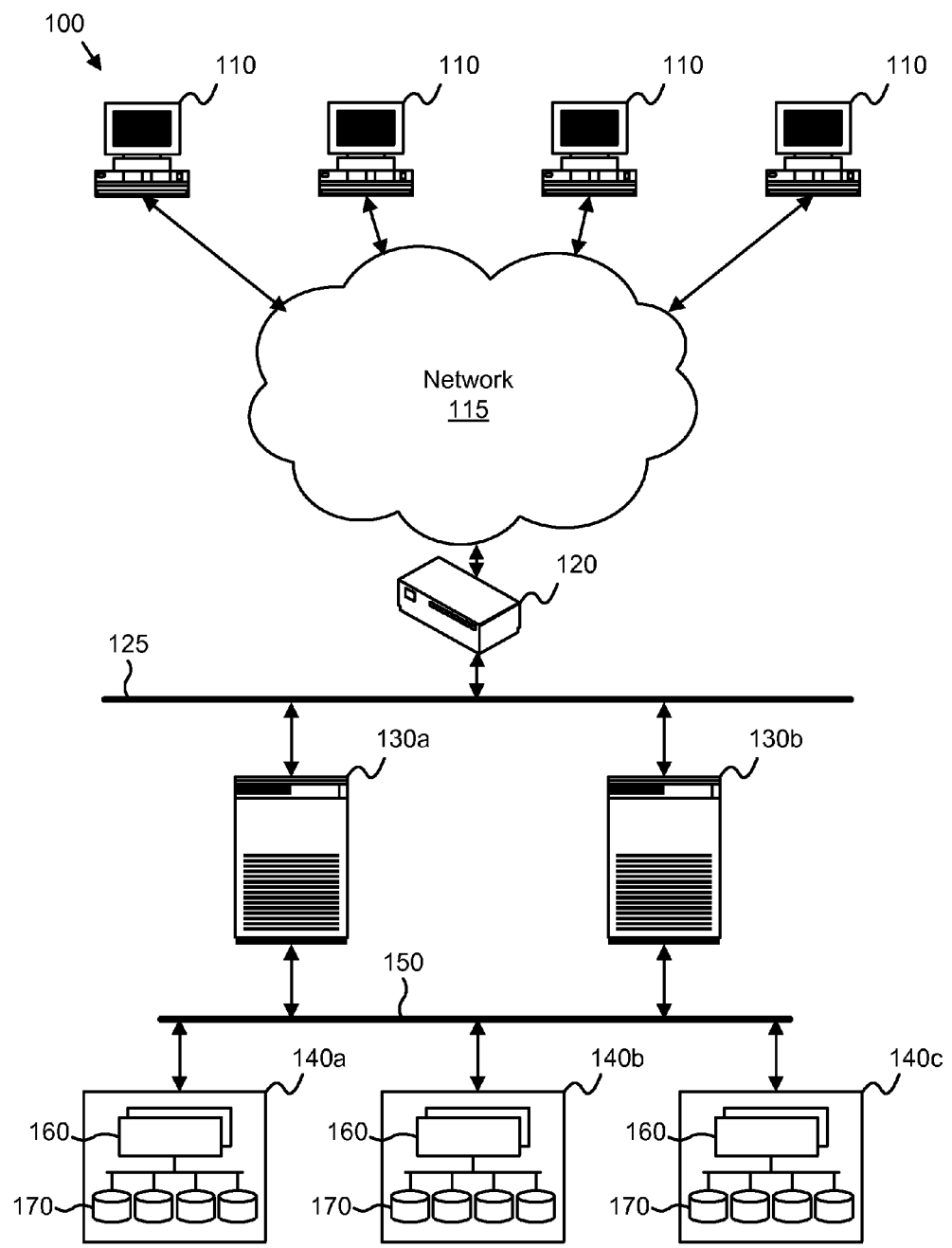
FIG. 1 is a schematic block diagram illustrating one embodiment of a data storage system in accordance with the present invention.

FIG. 1 is a schematic block diagram illustrating one embodiment of a data storage system 100 in accordance with the present invention. The system 100 includes one or more client computers 110, a network 115, a router 120, an internal network 125, one or more servers 130, a storage communications channel 150, and one or more storage subsystems 140.

As used herein, the client computers 110 are referred to as clients 110. The servers 130 may also be configured as mainframe computers, blade centers comprising multiple blade servers, and the like. Although for simplicity four clients 110, one network 115, one router 120, one internal network 125, two servers 130, one storage communications channel 150, and three storage subsystems 140 are shown, any number of clients 110, networks 115, routers 120, internal networks 125, servers 130, storage communications channels 150 and storage subsystems 140 may be employed.

Each storage subsystem 140 includes one or more storage controllers 160 and one or more hard disk drives 170. The hard disk drive s170 may be configured as a "just a bunch of disks" (JBOD), a redundant array of independent disks (RAID), and the like.

In one embodiment, the system 100 provides data storage for the clients 110. For example, a client 110 may access data stored on a hard disk drive 170 of a storage subsystem 140 by communicating a read request through the network 115, the router 120, the internal network 125, a server 130, and the storage communications channel 150 to a storage controller 160 for the hard disk drive 170. The storage controller 160 may retrieve the data from the hard disk drive 170 and communicate the data to the client 110. The storage controller 160 retrieving the data from the hard disk drive 170 is referred to herein as staging the data.

In an alternate embodiment, a client 110 may write data to a hard disk drive 170 by communicating the data and a request to the storage controller 160. The storage controller 160 may encode the data on the hard disk drive 170. The encoding of the data on the hard disk drive 170 is referred to herein as destaging.

The network 115 connecting the clients 110 and the servers 130 may be selected from a local area network (LAN), a wide area network (WAN), the Internet, an Ethernet network, a token ring network, or the like. The network 115 may comprise one or more nodes that may provide one or more physical and/or logical paths for transferring the data. The internal network 125 and the storage communications channel 150 may be for example a LAN, a WAN, or the like.

Figure 2:
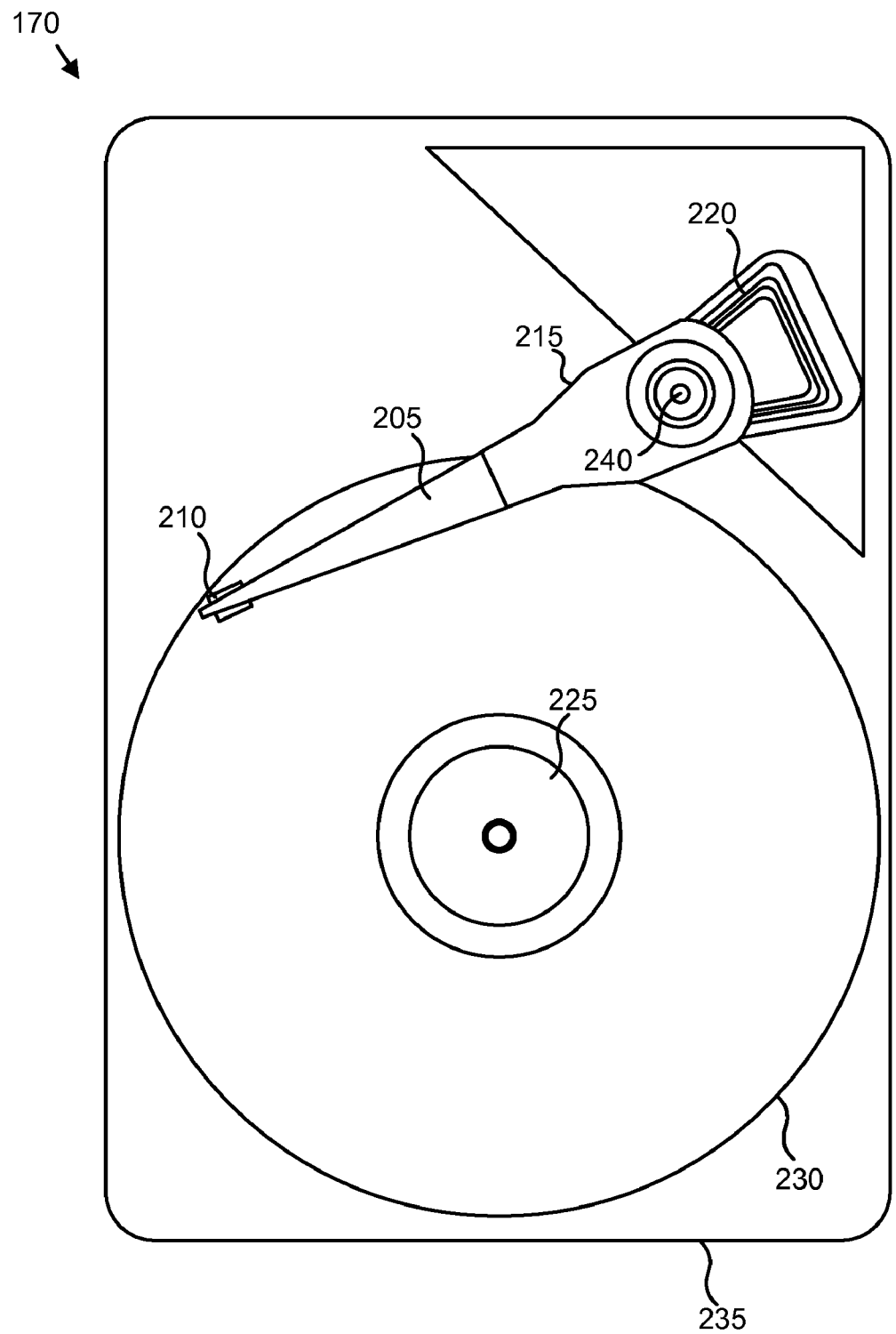
FIG. 2 is a schematic block diagram illustrating one embodiment of a hard disk drive in accordance with the present invention.

FIG. 2 is a schematic block diagram illustrating one embodiment of a hard disk drive 170 of the present invention. The hard disk drive 170 is the hard disk drive 170 of FIG. 1. A plurality of disks 230 may be connected to a spindle 225 resting on a platform 235 and may be rotated by a motor (not shown) at very high speeds. An actuator 215, motivated by a voice coil 220, rotates one or more actuator arms 205 that move about a pivot 240.

The disks 230 of the hard disk drive 170 may be primarily made from a non-magnetic material such as glass or aluminum and coated with a thin layer of magnetic materials such as Cobalt-based alloy or Iron (III) oxide. The plurality of disks 230 may store analog data by a frequency modulation method or by any other similar method. The frequency modulation method used may convert the data into a form of binary digits.

The voice coil 220 motivates the actuator arm 205 to move the read-write head 210 in an arc, geometrically centered about the pivot 240, across each disk 230, as the disks 230 spin, allowing the read-write head 210 to access the entire data surface of the hard disk 230. The read-write head 210 in close proximity of the disk 230 may write the data by magnetizing the magnetic material of the disk 230. One read-write head 110 may be used for each hard disk 130. The write head portion of read-write head 110 of the HARD DISK DRIVE 170 may be of the Metal in Gap (MIG) type, Thin Film (TF) type, or the like. The read head portion of read-write head 110 of the HARD DISK DRIVE 170 may be of the Magneto-Resistive (MR), Giant Magneto-Resistive (GMR), Tunnel Magneto-Resistive (TMR), Current Perpendicular to the Planes (CPP) type, or the like.

Figure 3:
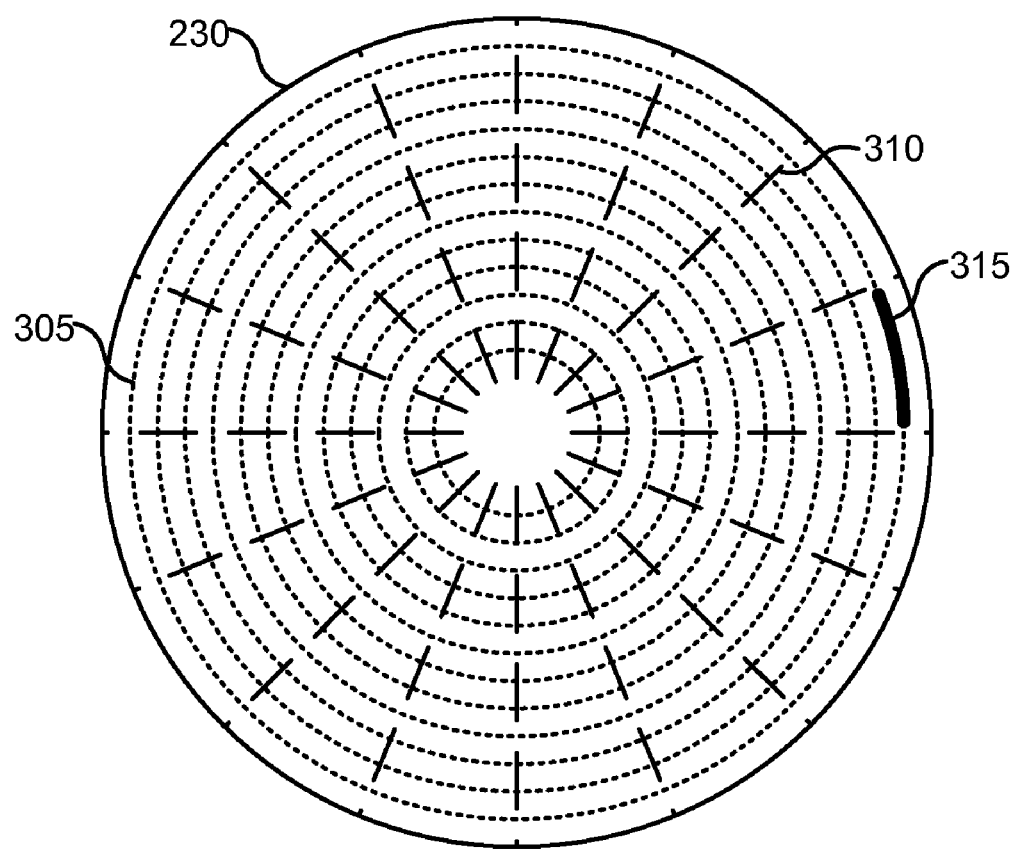
FIG. 3 is a schematic block diagram illustrating one embodiment of a disk in accordance with the present invention.

FIG. 3 is a schematic block diagram illustrating one embodiment of a disk 230 of the present invention. The disk 230 is the disk of FIG. 2. The disk 230 is shown with a plurality of radial areas 305 for encoding data. The areas 305 may be divided into sectors. A portion of an area 305 may be configured as a physical track 315. A physical track 315 may store a specified quantity of data.

Figure 4:
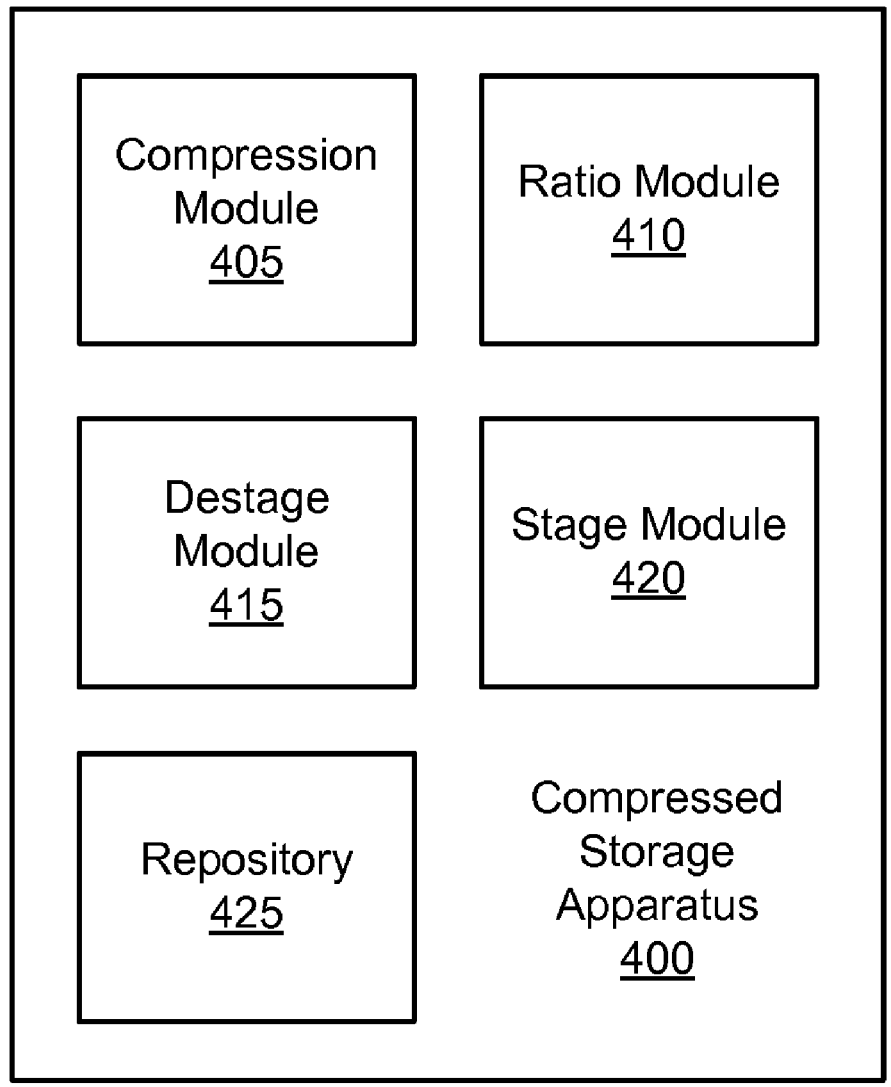
FIG. 4 is a schematic block diagram illustrating one embodiment of a compressed storage apparatus of the present invention.

FIG. 4 is a schematic block diagram illustrating one embodiment of a compressed storage apparatus 400 of the present invention. The apparatus 400 may be embodied in the storage controller 160 of FIG. 1. The description of the apparatus 400 includes elements of FIGS. 1-3, like numbers referring to like elements. The apparatus 400 includes a compression module 405, a ratio module 410, a destage module 415, a stage module 420, and a repository 425.

The compression module 405 compresses a data file. The data file is organized in logical tracks. In one embodiment, each logical track comprises a quantity of data less than or equal to a quantity of data in a physical track 315. In a certain embodiment, the size of the logical track is rounded up to a four kilobyte (4 kB) boundary. The compression module 405 may comprise a computer program product stored on a computer readable medium of the storage controller 160 having a computer readable program that executes on a processor of the storage controller 160. Alternatively, the compression module 405 comprises a computer program product residing on a client 110 or a server 130.

The ratio module 410 determines a track compression ratio. The track compression ratio is a ratio of an integer value n to one. For example, the track compression ratio may be four to one, three to one, two to one, or the like. The ratio module 410 may comprise a computer program product stored on a computer readable medium of the storage controller 160 having a computer readable program that executes on the processor of the storage controller 160.

The destage module 415 destages a single directory entry for the data file to a directory. The directory may associate data files including portions of data file with physical tracks 315 on one or more hard disk drives 170. The directory entry points to a zeroth track on a hard disk drive. As used herein, the zeroth track referrers to an initial track of a plurality of sequentially organized physical tracks 315. For example, the zeroth track may be track number 427, the first track may be track 428, and so on.

The destage module 415 further destages the data file sequentially to physical tracks 315 of a hard disk drive 170 from the zeroth track with n logical tracks of the data file stored on one physical track 315 of the hard disk drive 170. The destage module 415 may comprise a computer program product stored on a computer readable medium of the storage controller 160 having a computer readable program that executes on the processor of the storage controller 160.

The stage module stages a kth logical track from a physical track 315 of the hard disk drive 170. The physical track 315 is specified by an integer value of k divided by n as will be described hereafter. The stage module 420 may comprise a computer program product stored on a computer readable medium of the storage controller 160 having a computer readable program that executes on the processor of the storage controller 160.

The repository 425 is configured as a plurality of physical tracks 315 of one or more hard disk drives 170. The physical tracks 315 of the repository 425 may be allocated by an administrator, a configuration file, or the like. The storage controller 160 may dynamically add physical tracks 315 to and remove physical tracks 315 from the repository 425.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
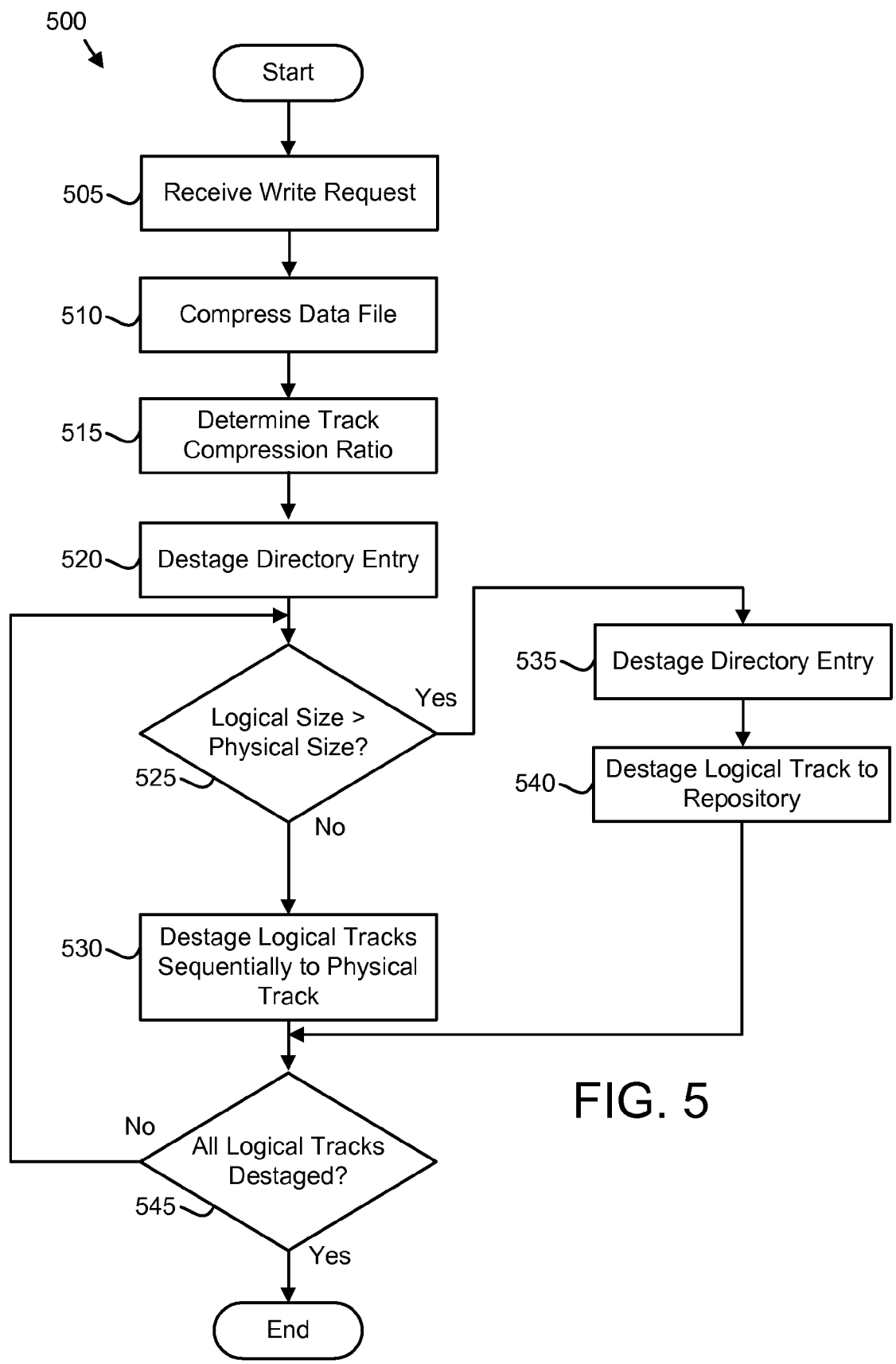
FIG. 5 is a schematic flow chart diagram illustrating one embodiment of a compressed storage method of the present invention.

FIG. 5 is a schematic flow chart diagram illustrating one embodiment of a compressed storage method 500 of the present invention. The method 500 substantially includes the steps to carry out the functions presented above with respect to the operation of the described apparatus and system of FIGS. 1-4. In one embodiment, the method 500 is implemented with a computer program product comprising a computer readable medium having a computer readable program. The computer readable program may be integrated into a computing system, such as the storage controller 160, wherein the program in combination with the computing system is capable of performing the method 500.

The method 500 starts and in one embodiment, the storage controller 160 receives 505 a write request. A client 110 may communicate a write request to the storage controller 160. Alternatively, a server 130 may communicate the write request. The write request may include a data file that is to be encoded on a hard disk drive 170. The data file is organized in logical tracks. In addition, the write request may include a logical name for the data file.

In one embodiment, the compression module 405 compresses 510 the data file. The data file may be compressed with a Lempel-Ziv compression algorithm, a Deflate compression algorithm, a Lempel-Ziv-Renau algorithm, or the like as is well known to those of skill in the art.

The ratio module 410 determines 515 a track compression ratio. In one embodiment, an administrator specifies track compression ratio for the ratio module 410. For example, the administrator may set the track compression ratio as three to one.

An alternate embodiment, the ratio module 410 calculates the track compression ratio as an integer compression ratio that is less than a data compression ratio of the data file. For example, a data file may have a data compression ratio of three point five (3.5) to one. The ratio module 410 may calculate the track compression ratio as three to one.

In one embodiment, the ratio module 410 determines 515 the track compression ratio from a type of the data file. For example, the ratio module 410 may set the track compression ratio to four to one for all text data files.

The destage module 415 destages 520 a single directory entry for the compressed data file to a directory. The directory entry may include the logical name for the data file. The directory entry points to a zeroth physical track 315 on a hard disk drive 170. In one embodiment, the zeroth digital track 315 is an initial physical track 315 for a plurality of consecutively numbered physical tracks 315.

For each n logical tracks in the compressed data file, where n is the value of the track compression ratio, the destage module 415 determines 525 if a logical size of the n logical tracks exceeds a physical size of a physical track 315. For example, if the logical size of the n logical tracks is five kilobytes (5 kB) and a physical size of the physical track 315 is four kilobytes (4 kB), the destage module 415 determines 525 that the logical size exceeds the physical size.

If the logical size exceeds the physical size, the destage module 415 destages 535 a directory entry to the directory for at least one logical track of the n logical tracks. In addition, the destage module 415 may destage 540 to the repository 425 at least one logical track of the n logical tracks as will be described hereafter. Sufficient logical tracks are destaged to the repository 425 so that the logical size of the remaining logical tracks is less than the physical size of the physical track 315.

If the logical size does not exceed the physical size, the destage module 415 destages 530 the n logical tracks of the compressed data file to physical tracks 315 of the hard disk drive 170. The destage module 415 begins from the zeroth track, sequentially destaging 530 logical tracks. In one embodiment, the destage module 415 may destage 530 logical tracks that are not in destaged to the repository 425. For example, if a first of three logical tracks is destaged 540 to the repository 425, the destage module 415 may destage 530 a second and third of the three logical tracks to the physical track 315.

The destage module 415 determines 545 if all logical tracks of the compressed data file are destaged. If all logical tracks are not destaged, the destage module 415 determines 525 if a logical size of the next n logical tracks exceeds the physical size of the physical track 315. Another directory entry is not required for the next n logical tracks as the logical tracks can be located with only the first single directory entry and a number of each logical track. If all logical tracks are destaged, the method 500 ends.

The method 500 destages 530 the compressed logical tracks to the hard disk drives 170 so that the logical tracks may be deterministically located as will be described hereafter. The latency for accessing the logical tracks may be reduced by reducing the need to stage directory data. In addition, the method 500 reduces the destaging of directory entries to the directory for the data file.

Figure 6:
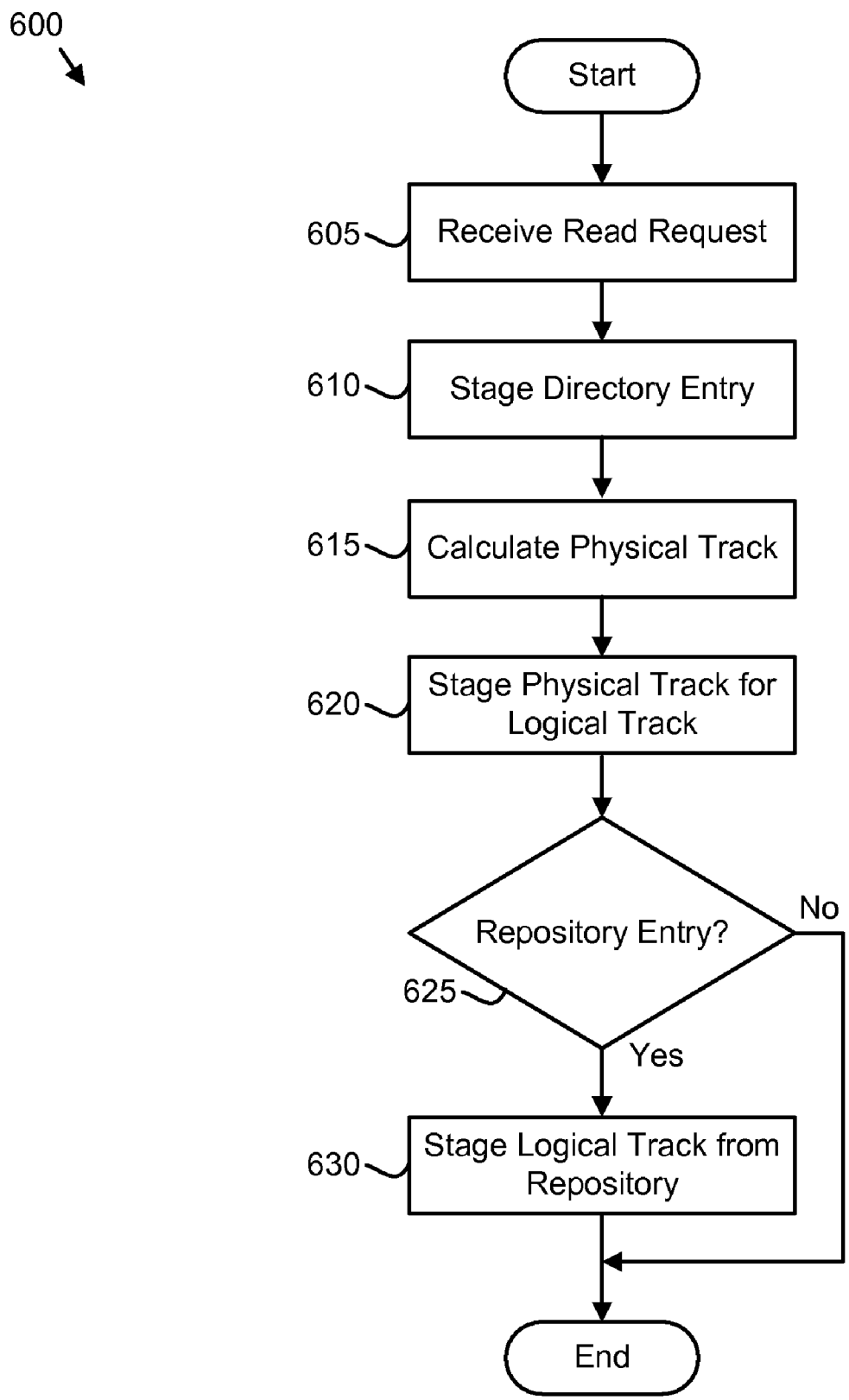
FIG. 6 is a schematic flow chart diagram illustrating one embodiment of a retrieval method of the present invention.

FIG. 6 is a schematic flow chart diagram illustrating one embodiment of a retrieval method 600 of the present invention. The method 600 substantially includes the steps to carry out the functions presented above with respect to the operation of the described apparatus and system of FIGS. 1-4. In one embodiment, the method 600 is implemented with a computer program product comprising a computer readable medium having a computer readable program. The computer readable program may be integrated into a computing system, such as the storage controller 160, wherein the program in combination with the computing system is capable of performing the method 600.

The method 600 begins and storage controller 160 receives 605 a read request. In one embodiment, a client 110 communicates a read request to the storage controller 160. Alternatively, a server 130 may communicate the read request. The read request may include a logical name corresponding to the directory entry of the data file. In addition, the read request may specify a logical track of the data file. Although for simplicity, the method 600 is described for retrieving a single logical track, one of skill in the art will recognize that the method 600 may be used to retrieve a plurality of logical tracks.

In one embodiment, the stage module 420 stages 610 the directory entry for the data file. The stage module 420 may use the logical name of the data file to locate and stage the directory entry. The stage module 420 may parse the location of the zeroth physical track 315 from the directory entry.

The stage module 420 may calculate 615 a location of a physical track 315 that stores the logical track. For example, the read request may specify a kth logical track of the data file. The stage module 420 may calculate 615 the location q of the physical track as the integer value of k divided by n. In addition, a storage module 420 may add the location of the zeroth physical track 315. Equation 1 illustrates calculating location q where z is the location of the zeroth physical track 315

$$q=(k/n)+z \qquad \text{Equation 1}$$

The stage module 420 stages 620 the kth logical track by staging the specified physical track 315 from the hard disk drive 170. In one embodiment, the stage module 420 stages 620 the kth logical track by directing the hard disk drive 170 to communicate a logical track to the storage controller 160.

In one embodiment, the stage module 420 determines 625 if there is a repository entry for the kth logical track. For example, the stage module 420 may check the directory for a directory entry for the kth logical track. If the stage module 420 determines 625 that there is a repository entry for the kth logical track, the stage module 420 stages 630 the logical track from the repository 425 and the method 600 ends. In one embodiment, the stage module 420 assembles the kth logical track from the compressed logical tracks stored on the physical track 315 and/or a logical track stored in the repository 425.

If the stage module 420 determines 625 that there is no repository entry for the kth logical track, the method 600 ends. The method of 600 allows the stage module 422 rapidly locate and stage 620 logical tracks. Instead of accessing the directory for each of a plurality of logical tracks, the stage module 420 accesses the directory for the location of the zeroth physical track 315 of the data file and calculates the locations of the logical tracks.

Figure 7:
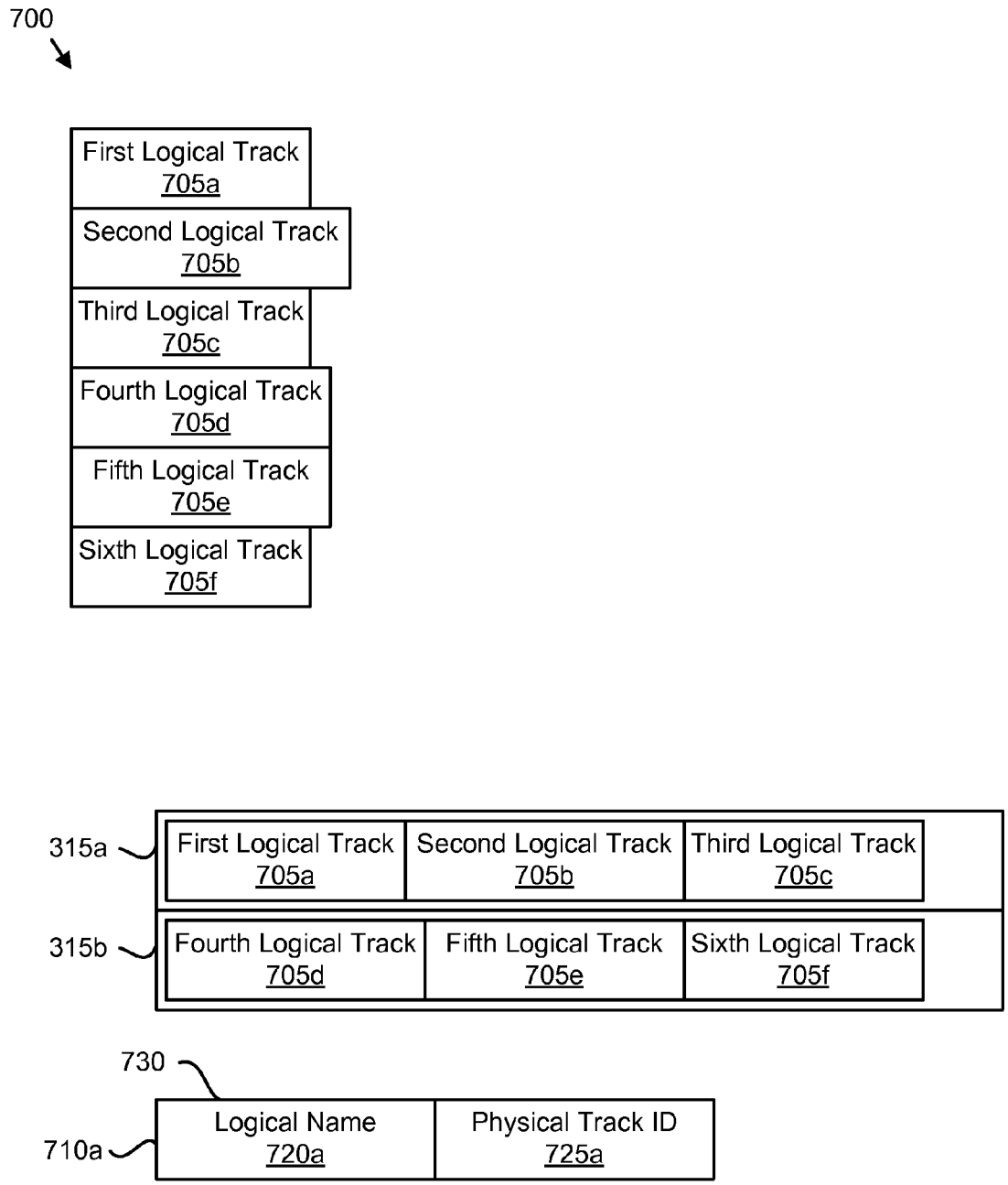
FIG. 7 is a schematic block diagram illustrating one embodiment of logical and physical tracks of the present invention.

FIG. 7 is a schematic block diagram illustrating one embodiment of logical and physical tracks 700 of the present invention. The description of the tracks 700 refers to elements of FIGS. 1-6, like numbers referring to like elements.

A first, second, third, fourth, fifth, and sixth logical track 705*a-f* are shown. The logical tracks 705 may be exemplary of a data file. Typically, a data file comprises a large number of logical tracks 705. However for simplicity, only six logical tracks 705 are shown.

The logical tracks 705 may be stored in a semiconductor memory of the storage controller 160. Alternatively, the logical tracks 705 may be stored in a storage device such as semiconductor memory and/or a hard disk drive of a client 110 and/or a server 130. In one embodiment, each logical track 705 is originally configured to be written to one physical track 315. For example, each logical track 705 may originally comprise no more than four kilobytes (4 kB) of data.

The compression module 405 compresses 510 the logical tracks 705, and the logical tracks 705 are depicted as compressed. Thus the size of each logical track 705 may be substantially less than the size of a physical track 315.

Two physical tracks 315*a-b* is also shown. Instances of the logical tracks 705 are depicted as destaged 530 to the physical tracks 315. As shown, the compressed logical tracks 705 are all stored on the two physical tracks 315*a-b*. The first physical track 315*a* may be configured as the zeroth physical track. The second physical track 315*b* is sequentially numbered from the first physical track 315*a*.

In addition, the destage module 415 may destage 520 the first directory entry 710*a* for the data file to the directory 730. For simplicity, the directory 730 is shown with a first directory entry 710*a*. Each directory entry 710 may include a logical name 720 for the data file and a corresponding physical track ID 725. The first directory entry 710*a* is shown with a first logical name 720*a* and a first physical track identifier (ID) 725*a* for the data file. The track ID 725*a* points to the zeroth physical track 315.

Figure 8:
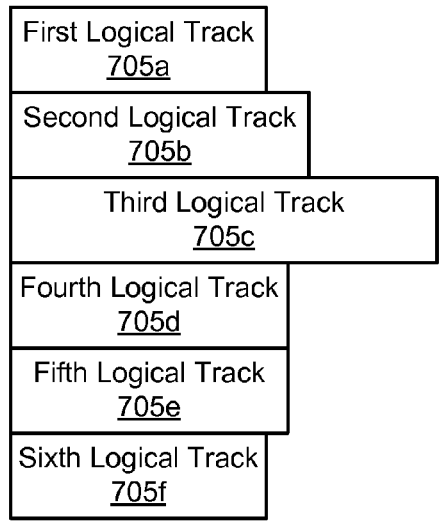
FIG. 8 is a schematic block diagram illustrating one embodiment of a repository of the present invention.
Figure 8:
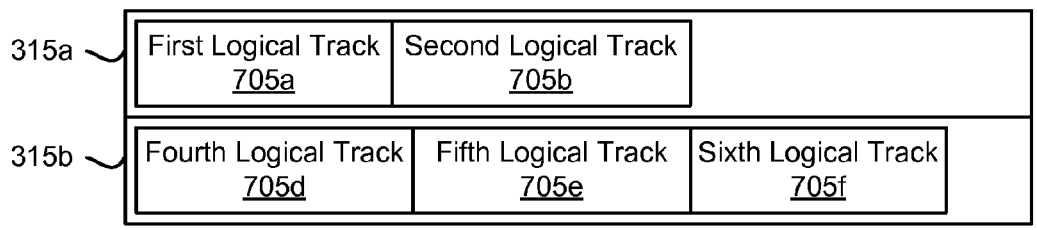
Figure 8:
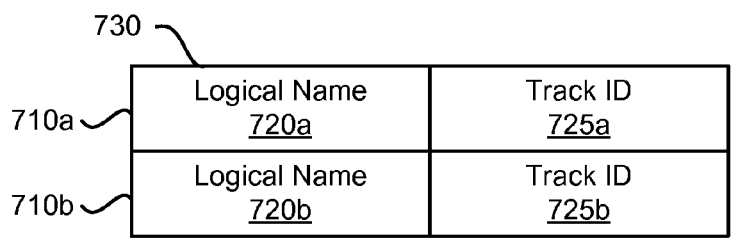
Figure 8:
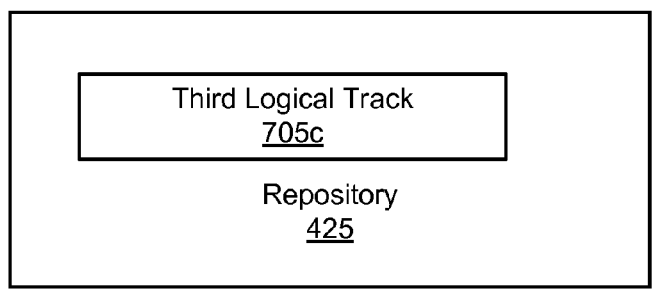

The tracks 700 are exemplary of an instance where the logical size of n logical tracks 705 is less than or equal to the physical size of the physical track 315. FIG. 8 includes an example of an instance where the logical size of n logical tracks 705 is greater than the physical size of the physical track 315.

FIG. 8 is a schematic block diagram illustrating one embodiment of a repository 425 of the present invention. The repository 425 is shown with the tracks 700 of FIG. 7. The third logical tracks 705*c* of FIG. 7 is shown with a larger compressed size. Thus, as depicted the size of the first, second, and third logical tracks 705*a-c* exceeds the size of the first physical track 315*a*.

As shown, the first and second logical tracks 705*a-b* are destaged 530 to the physical track 315. However, the third logical track 705*c* is destaged 540 to the repository 425. In addition, the destage module 415 may destage 535 a second directory entry 710*b* to the directory 734 for the third logical track 705*c*. The fourth, fifth, and sixth logical tracks 705*d-f* are destaged to the second physical track 315*a* as in FIG. 7. Thus the present invention may deterministically store most compressed logical tracks 705 to physical tracks 315. Logical tracks 705 that may not be deterministically destaged 530 are destaged 540 to the repository 425.

The present invention allows a track compression ratio to be selected that is close to the overall compression ratio of the data file. Compressed logical tracks 705 that cannot be destaged to a single physical track 315 can be destaged to a combination of the single physical track 315 and the repository 425.

The present invention stores and retrieves compressed data files. The location of the compressed data files may be logically determined. In addition, the present invention reduces a number of directory entries 710 required for large compressed files. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer useable medium having a computer readable program stored on a tangible storage device, wherein the computer readable program when executed on a computer causes the computer to:
   compress a data file organized in logical tracks;
   determine a track compression ratio wherein the track compression ratio is a ratio of an integer value n to one;
   destage only a single directory entry for the data file to a directory, wherein the directory entry comprises only a logical name for the data file and a single zeroth track location z on a hard disk drive;
   destage the data file sequentially to tracks of the hard disk drive from the zeroth track with n logical tracks of the data file stored on one physical track of the hard disk drive; and
   stage a logical track with a logical track number of k from a physical track of the hard disk drive specified by a location q using only the zeroth track location z, the track compression ratio n, and k, wherein q is calculated as q=(INTEGER(k/n))+z and (INTEGER(k/n)) is an integer value of (k/n).

2. The computer program product of claim 1, wherein the computer readable program is further configured to cause the computer to calculate the track compression ratio as an integer compression ratio that exceeds a data compression ratio of the data file.

3. The computer program product of claim 1, wherein the computer readable program is further configured to cause the computer to determine the track compression ratio from a type of the data file.

4. The computer program product of claim 1, wherein the computer readable program is further configured to cause the computer to destage to a repository at least one track of n logical tracks directed to a physical track if a size of the n logical tracks exceeds a size of the physical track.

5. The computer program product of claim 1, wherein a size of each logical track is rounded up to a four kilobyte boundary.

6. An apparatus to store and retrieve compressed data, the apparatus comprising:
   a compression module configured to compress a data file organized in logical tracks;
   a ratio module configured to determine a track compression ratio wherein the track compression ratio is a ratio of an integer value n to one;
   a destage module configured to destage only a single directory entry for the data file to a directory, wherein the directory entry comprises only a logical name for the data file and a single zeroth track location z on a hard disk drive, and destage the data file sequentially to tracks of the hard disk drive from the zeroth track with n logical tracks of the data file stored on one physical track of the hard disk drive; and
   a stage module configured to stage a logical track with a logical track number of k from a physical track of the hard disk drive specified by a location q using only the zeroth track location z, the track compression ratio n, and k, wherein q is calculated as q=(INTEGER(k/n))+z and (INTEGER(k/n)) is an integer value of (k/n).

7. The apparatus of claim 5, wherein the ratio module calculates the track compression ratio as an integer compression ratio that exceeds a data compression ratio of the data file.

8. The apparatus of claim 5, wherein the ratio module determines the track compression ratio from a type of the data file.

9. The apparatus of claim 5, wherein the destage module is further configured to destage to a repository at least one track of n logical tracks directed to a physical track if a size of the n logical tracks exceeds a size of the physical track.

10. The apparatus of claim 9, wherein a size of each logical track is rounded up to a four kilobyte boundary.

11. A method for deploying computer infrastructure, comprising integrating a computer readable program stored on a tangible storage device into a computing system, wherein the program in combination with the computing system is capable of performing the following:
- compressing a data file organized in logical tracks;
- determining a track compression ratio wherein the track compression ratio is a ratio of an integer value n to one;
- destaging only a single directory entry for the data file to a directory, wherein the directory entry comprises only a logical name for the data file and a single zeroth track location z on a hard disk drive;
- destaging the data file sequentially to tracks of the hard disk drive from the zeroth track with n logical tracks of the data file stored on one physical track of the hard disk drive; and
- staging a logical track with a logical track number of k from a physical track of the hard disk drive specified by a location q using only the zeroth track location z, the track compression ratio n, and k, wherein q is calculated as q=(INTEGER(k/n))+z and(INTEGER(k/n)) is an integer value of (k/n).

12. The method of claim 11, wherein the method further comprises destaging to a repository at least one track of n logical tracks directed to a physical track if a size of the n logical tracks exceeds the size of the physical track.

13. The method of claim 11, further comprising calculating the track compression ratio as an integer compression ratio that exceeds a data compression ratio of the data file.

14. The method of claim 11, wherein the track compression ratio is determined from a type of the data file.

15. A system to store and retrieve compressed data, the system comprising:
- a network;
- a plurality of hard disk drives;
- a controller in communication with the network and the hard disk drives, the controller configured to manage the hard disk drives and comprising
  - a compression module configured to compress a data file organized in logical tracks;
  - a ratio module configured to determine a track compression ratio wherein the track compression ratio is a ratio of an integer value n to one;
  - a destage module configured to destage only a single directory entry for the data file to a directory, wherein the directory entry comprises only a logical name for the data file and a single zeroth track location z on a hard disk drive, and destage the data file sequentially to tracks of the hard disk drive from the zeroth track with n logical tracks of the data file stored on one physical track of the hard disk drive; and
  - a stage module configured to stage a logical track with a logical track number of k from a physical track of the hard disk drive specified by a location q using only the zeroth track location z, the track compression ratio n, and k, wherein q is calculated as q=(INTEGER(k/n))+z and(INTEGER(k/n)) is an integer value of (k/n).

* * * * *